United States Patent
Wei et al.

[11] Patent Number: 5,984,982
[45] Date of Patent: Nov. 16, 1999

[54] ELECTROCHEMICAL SYNTHESIS OF COBALT OXYHYDROXIDE

[75] Inventors: Guang Wei, Southborough; Weifang Luo, Norwood, both of Mass.

[73] Assignee: Duracell Inc., Bethel, Conn.

[21] Appl. No.: 08/924,152

[22] Filed: Sep. 5, 1997

[51] Int. Cl.⁶ .................................................. H01M 4/04
[52] U.S. Cl. .................... 29/623.1; 29/623.5; 205/509; 429/223; 429/206
[58] Field of Search .......................... 205/509; 429/223, 429/206; 29/623.1, 623.5

[56] References Cited

U.S. PATENT DOCUMENTS

| | | | |
|---|---|---|---|
| 3,941,614 | 3/1976 | Jackovitz et al. | 136/29 |
| 4,065,543 | 12/1977 | Sare et al. | 423/240 |
| 4,176,021 | 11/1979 | O'Sullivan | 204/96 |
| 4,218,240 | 8/1980 | Gingerich et al. | 423/143 |
| 4,395,278 | 7/1983 | Vanderpool et al. | 423/592 |
| 4,603,094 | 7/1986 | Yasuda | 429/91 |
| 4,605,285 | 8/1986 | Fujiwara et al. | 350/357 |
| 4,844,948 | 7/1989 | Nakahori et al. | 429/223 |
| 4,844,999 | 7/1989 | Oshitani et al. | 429/223 |
| 4,983,455 | 1/1991 | Wakai et al. | 428/336 |
| 5,057,299 | 10/1991 | Lown | 423/592 |
| 5,200,282 | 4/1993 | Ohnishi et al. | 429/223 |
| 5,356,732 | 10/1994 | Terasaka et al. | 429/52 |
| 5,405,714 | 4/1995 | Terasaka et al. | 429/52 |
| 5,419,981 | 5/1995 | Golben | 429/101 |
| 5,435,055 | 7/1995 | Furukawa et al. | 29/623.5 |
| 5,489,314 | 2/1996 | Bogauchi et al. | 29/623.5 |
| 5,514,497 | 5/1996 | Furukawa et al. | 429/223 |
| 5,523,182 | 6/1996 | Ovshinsky et al. | 429/223 |
| 5,587,133 | 12/1996 | Amatucci et al. | 423/138 |

FOREIGN PATENT DOCUMENTS

| | | |
|---|---|---|
| 0 403 052 | 12/1990 | European Pat. Off. |
| 0 684 324 A1 | 11/1995 | European Pat. Off. |
| 0 696 076 A1 | 2/1996 | European Pat. Off. |
| 53-79778 | 12/1976 | Japan |
| 62-061271 | 3/1987 | Japan |
| 62-066570 | 3/1987 | Japan |
| 63-285870 | 11/1988 | Japan |
| 1107453 | 4/1989 | Japan |
| 1281670 | 11/1989 | Japan |
| 2265165 | 10/1990 | Japan |
| 3078965 | 4/1991 | Japan |
| 3093161 | 4/1991 | Japan |
| 5151962 | 6/1993 | Japan |
| 7002027 | 1/1995 | Japan |
| 7169466 | 7/1995 | Japan |
| 07-320732 | 12/1995 | Japan |
| 7320733 | 12/1995 | Japan |
| 7320735 | 12/1995 | Japan |
| WO 96/14666 | 5/1996 | WIPO |

OTHER PUBLICATIONS

Maeda et al., "Cathode mass for alkaline secondary batteries, its manufacture, cathodes, and alkaline secondary batteries", Chemical Abstracts, vol. 126, No. 17, Apr. 28, 1997.

Humberto Gomez, "Potentiodynamic study of a colloidal cobalt(II) hydroxide electrode formed on different substrates", Chemical Abstracts, vol. 96, No. 26, Jun. 28, 1982.

*Primary Examiner*—Kishor Mayekar
*Attorney, Agent, or Firm*—Fish & Richardson P.C.

[57] ABSTRACT

A method of manufacturing conductive cobalt oxyhydroxide, including providing a positive electrode, a negative electrode, a CoOOH precursor, and a basic solution to form a combination; applying a current to the positive electrode to form conductive CoOOH on the positive electrode; then removing the conductive CoOOH from the combination, is disclosed.

16 Claims, 5 Drawing Sheets

ELECTROCHEMICAL SYNTHESIS OF COBALT OXYHYDROXIDE

BACKGROUND OF THE INVENTION

The invention relates to the synthesis of cobalt oxyhydroxide.

Cobalt oxyhydroxide (CoOOH) can be used, for example, in the manufacturing of batteries. A battery typically includes one or more galvanic cells (i.e., cells that produce a direct current of electricity) in a finished package. In each cell, two electrodes are separated by an electron insulator, but are joined by an ion-carrying path. The electron-carrying path of the battery is external; the path proceeds, via a conductor, through a device where work is done. The ion-carrying path of the battery is internal and proceeds via an electrolyte.

The electrodes are usually composed of dissimilar metal compounds. The positive electrode, or cathode, is the oxidizing electrode. This electrode accepts electrons from the external circuit and is reduced during the electrochemical reaction. The negative electrode, or anode, is the reducing electrode. This electrode releases electrodes to the external circuit and is oxidized during the electrochemical reaction. The electrolyte generally is composed mainly of an ionizable salt dissolved in a solvent.

Batteries may be rechargeable; such batteries are called "storage" or "secondary" batteries. Storage batteries can be recharged by passing current through the cells in the opposite direction of discharge current flow. The chemical conditions of the battery are restored, and the cells are ready to be discharged again. Primary batteries, on the other hand, are meant to be discharged to exhaustion once, and then discarded.

An example of a rechargeable battery is a metallic oxide-hydrogen storage battery. The positive electrode of this battery includes a metal oxide, such as nickel hydroxide; the negative electrode includes a hydrogen storage alloy; and the electrolyte includes an alkaline solution.

An example of an electrode reaction in a nickel hydroxide-hydrogen storage battery is as follows.

Positive electrode:

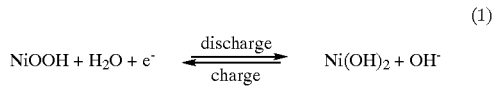

(1)

Negative electrode:

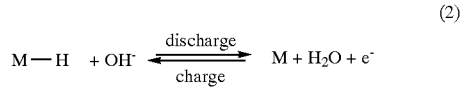

(2)

The positive electrode may be sintered or non-sintered. A sintered positive electrode may be formed by coating an electrochemically conductive substrate, such as punched steel plate, with a slurry containing nickel powder; the substrate is then sintered to obtain a porous sintered substrate. The pores of the substrate are filled with an active mass (e.g., nickel hydroxide) using a solution infiltration method, in which the substrate is infiltrated with a nickel salt solution, then treated with an alkaline reagent. Non-sintered electrodes may be prepared by directly coating a porous substrate with a paste containing the active mass, thereby filling the pores of the substrate.

Since nickel hydroxide ($Ni(OH)_2$) is not a conductive material, a conductive path must be formed to charge all of the $Ni(OH)_2$ particles in the electrode. One way to form a conductive path is to add a cobalt compound, such as cobalt oxide (CoO), to the $Ni(OH)_2$. During cell use, the CoO is converted to a more conductive form of cobalt, CoOOH. The CoOOH forms a conductive network, allowing the $Ni(OH)_2$ to be fully charged and discharged, as shown in Equation (1).

SUMMARY OF THE INVENTION

In general, the invention features a method of manufacturing conductive CoOOH. The method includes providing a positive electrode, a negative electrode, a CoOOH precursor, and a basic solution to form a combination; applying a current to the positive electrode to form conductive CoOOH on the positive electrode; then removing the conductive CoOOH from the combination. This method is referred to herein as an "electrochemical synthesis of cobalt oxyhydroxide." The CoOOH formed by this method is conductive, meaning that is has a specific conductivity of at least 0.1 s/cm at a pressure of 2000 kg/cm², and preferably at least 0.5 s/cm, for example 1.0 s/cm, 1.5 s/cm, 2.0 s/cm, or 2.5 s/cm.

Electrochemically synthesized CoOOH can be used in a variety of applications. For example, it can be combined with nickel hydroxide to form a positive electrode that can be used in a battery.

Other features and advantages of the invention will be apparent from the description of the preferred embodiments thereof, and from the claims.

DESCRIPTION OF THE PREFERRED EMBODIMENTS

Cobalt oxyhydroxide may be electrochemically synthesized as follows. A positive electrode composed mainly of either nickel (Ni) plate, or nickel foam with CoO paste added, is rolled into a Swiss roll and placed in a Ni can having a number of holes. The can is then placed in a Teflon mesh basket, which in turn is placed in a beaker. A negative electrode composed mainly of platinum (Pt) plate or gauze is added to the beaker. CoO powder is combined with 7M potassium hydroxide (KOH), and the resulting suspension is added to the beaker containing the electrodes. An anodic current is applied to the positive electrode while the KOH solution is agitated. Conductive CoOOH forms on the positive electrode.

The progress of the reaction can be monitored visually. At the beginning of the reaction, the reaction mixture contains a brown powder (CoO) in a blue solution. When the reaction is complete, the mixture contains a black powder (CoOOH) in a clear solution. When the reaction is complete, the CoOOH is removed from the positive electrode.

EXAMPLE 1

Figure 1:
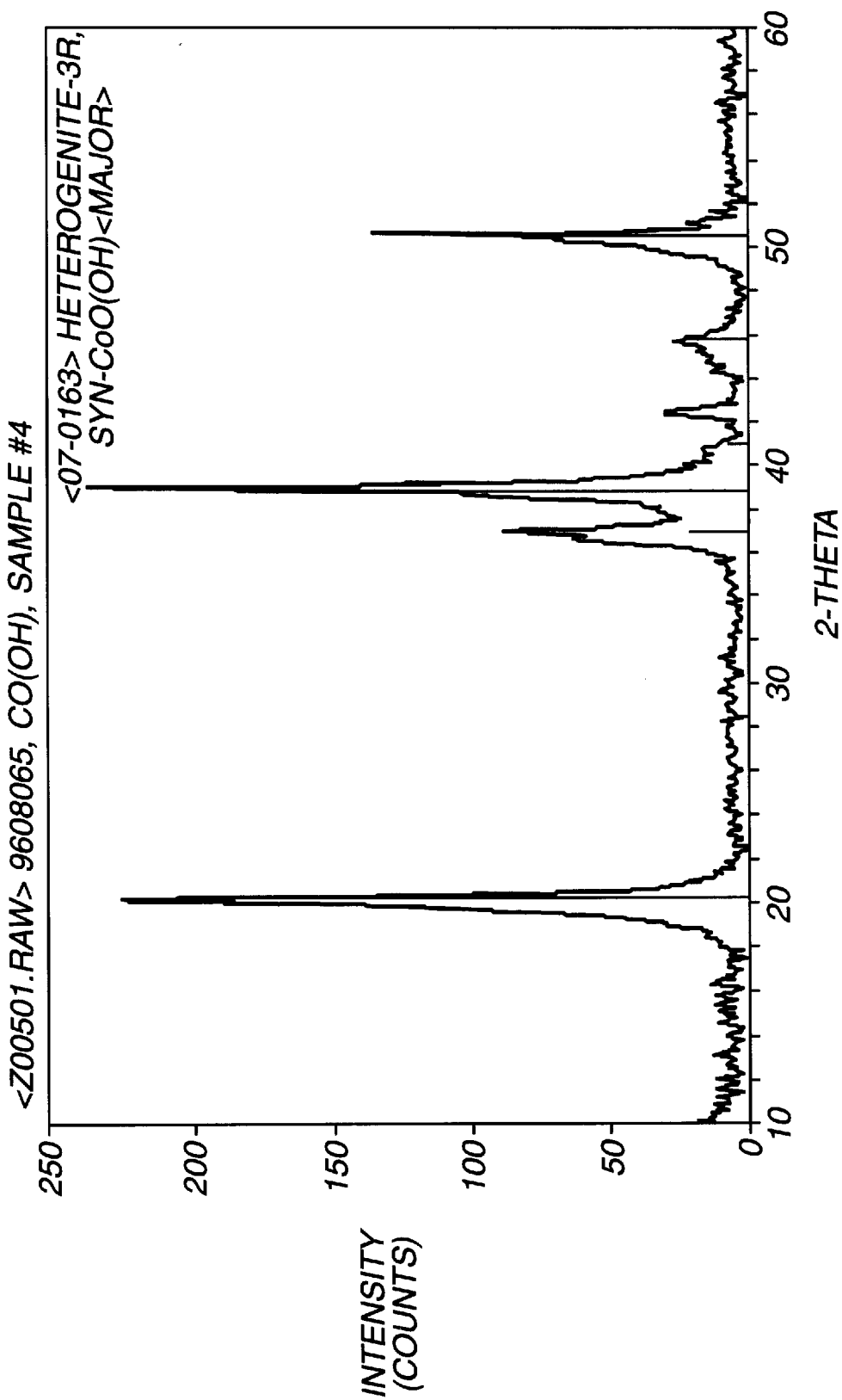
FIG. 1 is an XRD spectrum of a conductive CoOOH powder.
Figure 2:
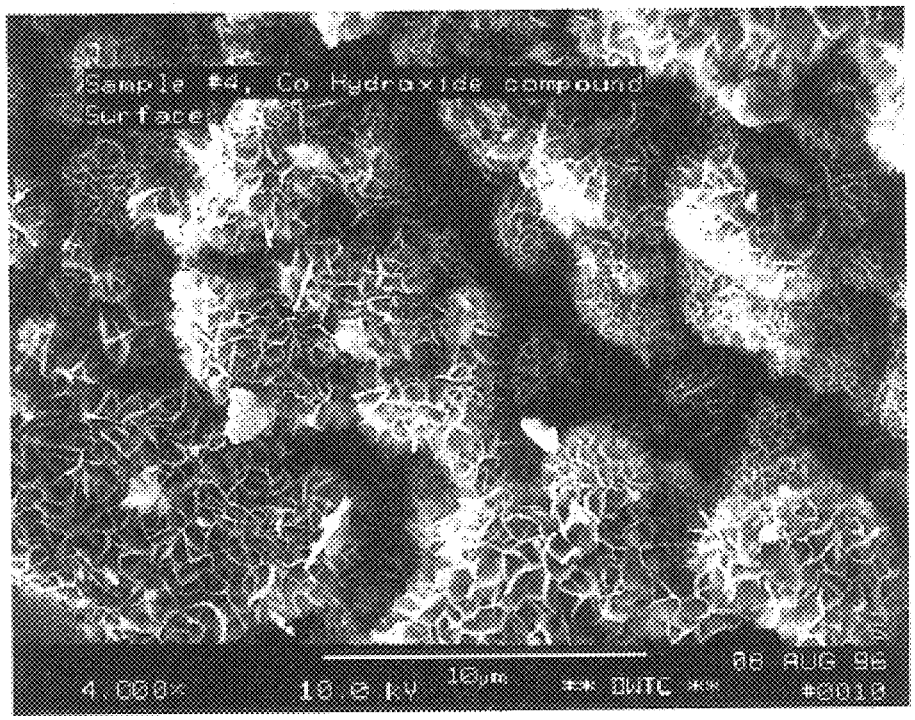
FIGS. 2–9 are SEM micrographs of a conductive CoOOH powder.
Figure 3:
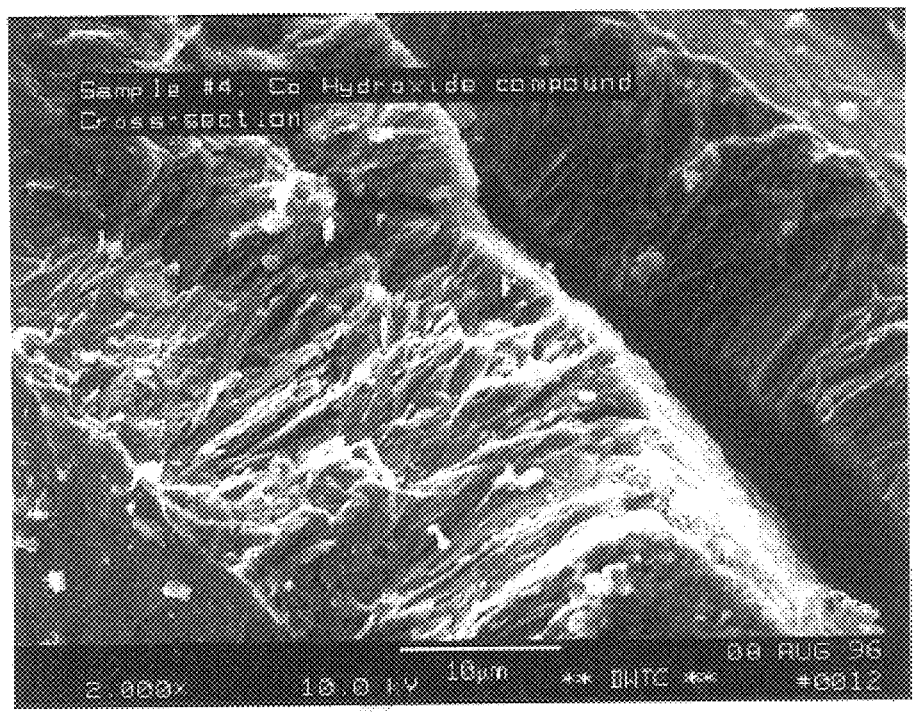
Figure 4:
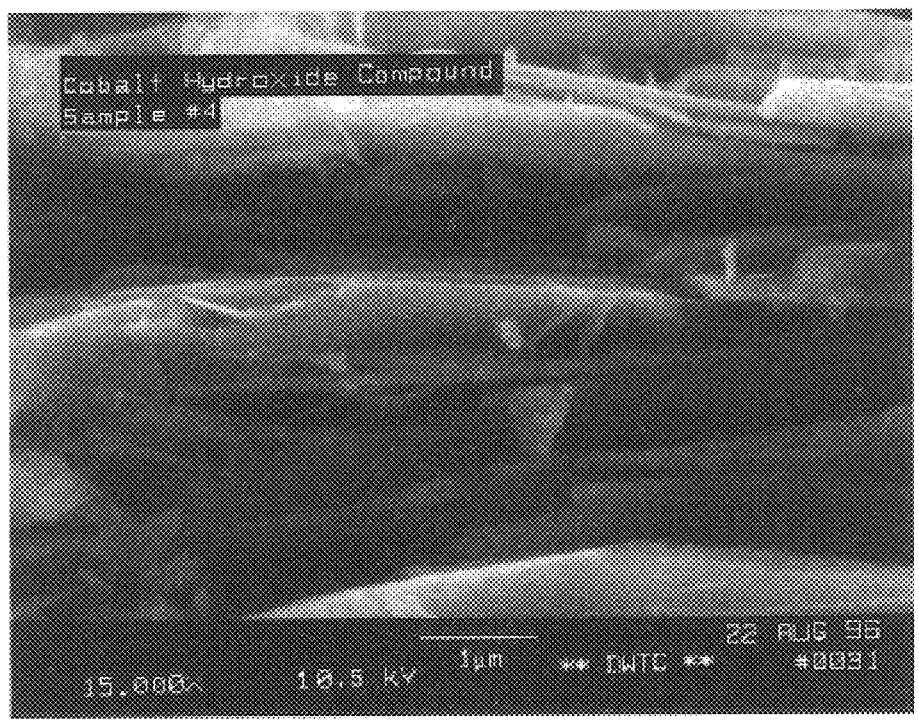
Figure 5:
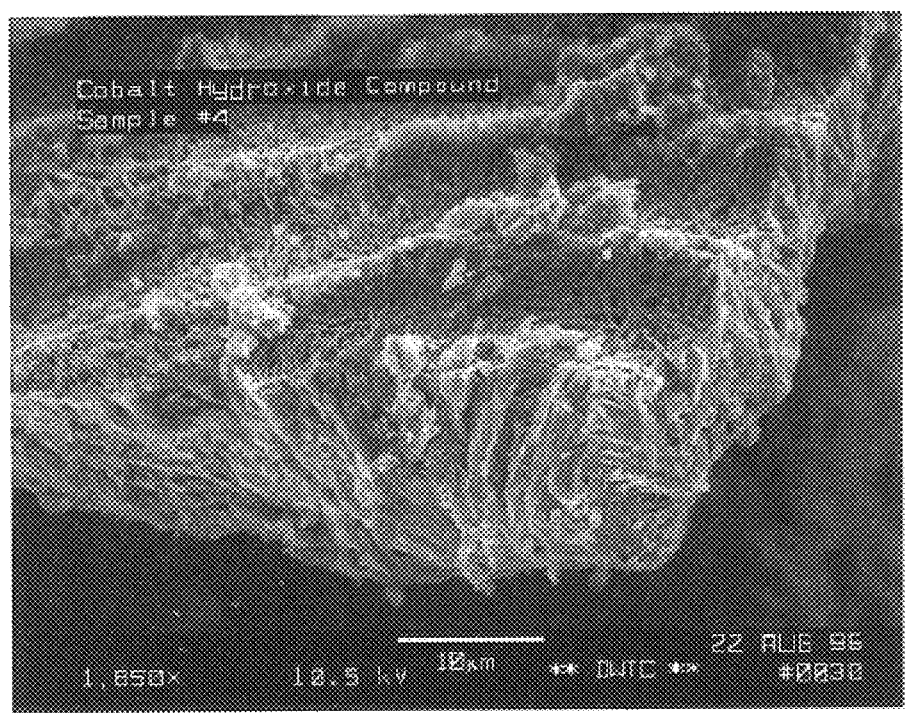
Figure 6:
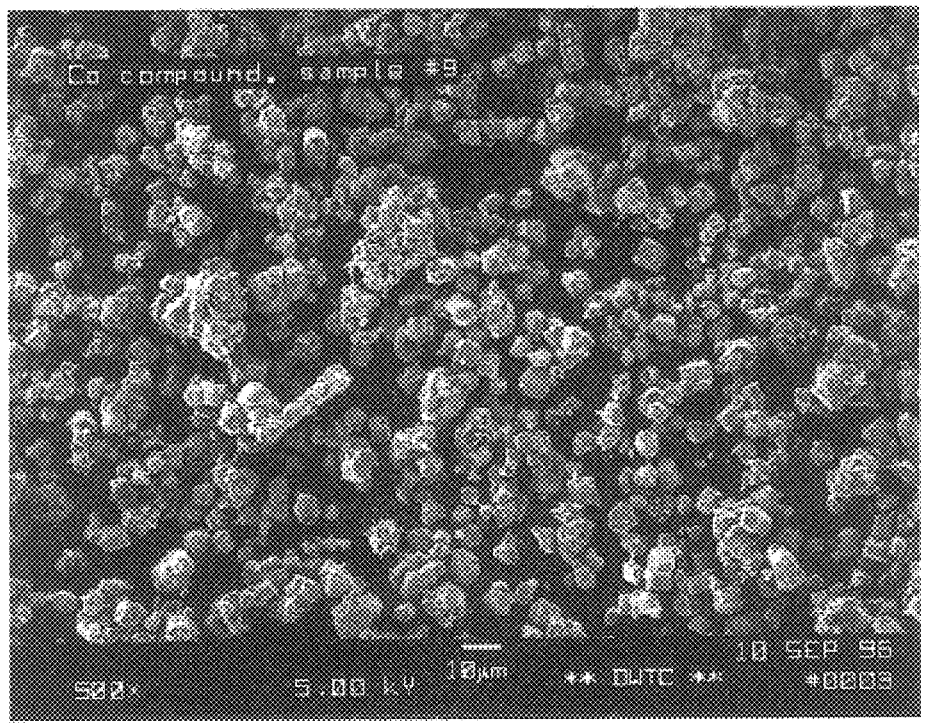
Figure 7:
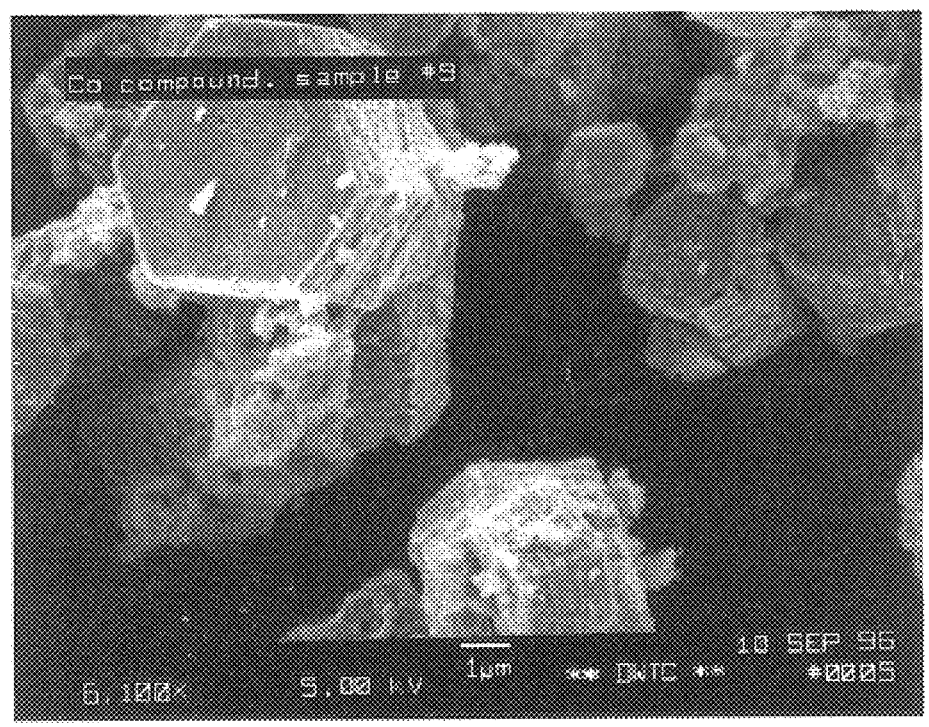
Figure 8:
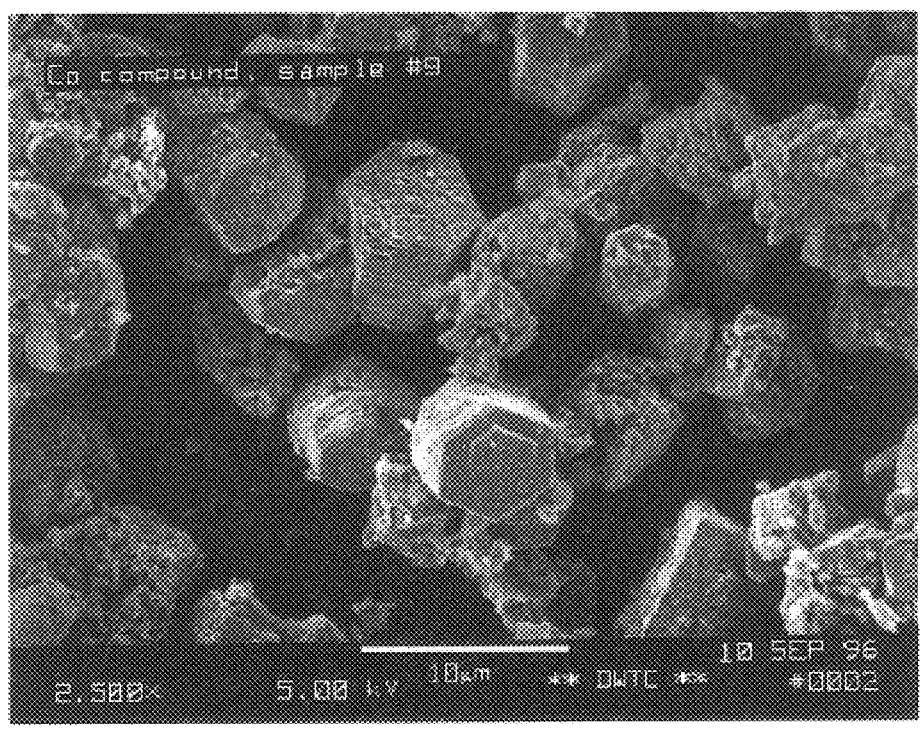
Figure 9:
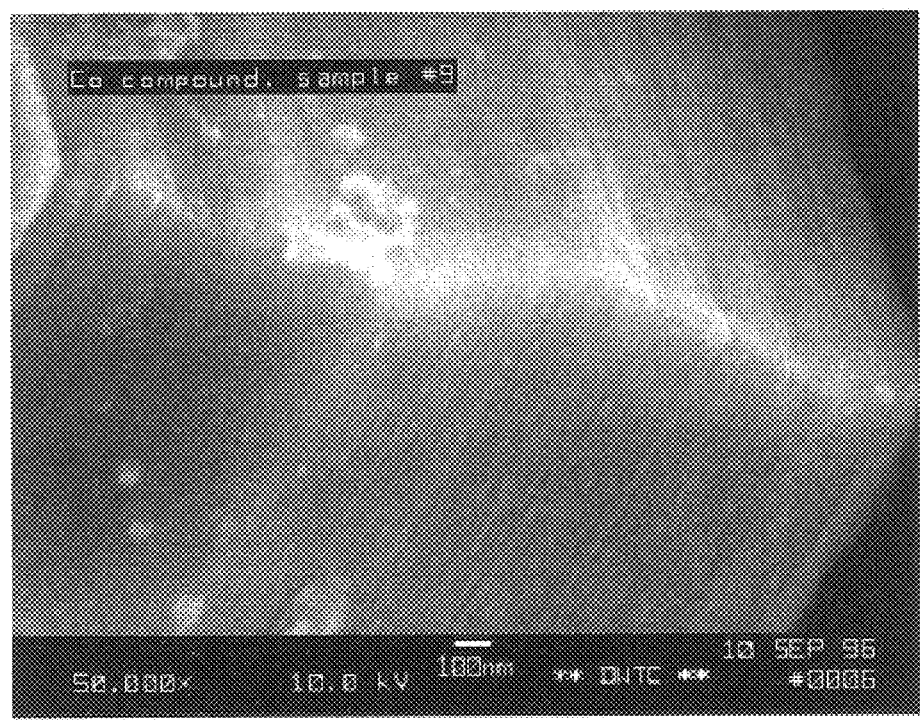

7 g CoOOH was prepared according to the procedure described above. A nickel foam/CoO paste positive electrode was rolled into a Swiss roll and placed in a Ni can. A number of holes, spaced approximately 8 mm apart, were punched in the can. 10 g CoO was combined with 450 mL KOH and added to the can. A current of 160 mA was applied for 23 hours while the KOH solution was stirred at a rate of 60 rpm. The CoOOH formed was a black powder with a specific conductivity of 0.3–1.0 s/cm at a pressure of 2000 kg/cm$^2$, and had a hexagonal, plate-like morphology. An XRD spectrum of the compound, shown in FIG. 1, confirmed that the compound prepared and isolated was CoOOH.

EXAMPLE 2

15 mg CoOOH was prepared according to the procedure described above, using a nickel plate positive electrode, 4 g CoO, and 450 mL KOH. A current of 3 mA was applied for 8 hours, during which time the mixture was stirred at a rate of 60 rpm.

EXAMPLE 3

6.5 g CoOOH was prepared according the procedure described above, using a nickel foam/CoO paste positive electrode, 7 g CoO, and 450 mL KOH. A number of holes, spaced approximately 8 mm apart, were punched in the Ni can. A current of 60 mA was applied for 43 hours, during which time the mixture was stirred at a rate of 60 rpm. SEM micrographs of this compound, shown in FIGS. 2–5, revealed that the average size of the CoOOH crystals formed using this method was 20 μm.

EXAMPLE 4

20 g CoOOH was prepared according the procedure described above, using a nickel foam/CoO paste positive electrode, 28 g CoO, and 450 mL KOH. A number of holes, spaced approximately 3 mm apart, were punched in the Ni can. A current of 160 mA was applied for 63 hours, during which time the mixture was stirred at a rate of 60 rpm. SEM micrographs of the compound, shown in FIGS. 6–9, revealed that the average size of the CoOOH crystals formed using this method was 5–6 μm.

EXAMPLE 5

A positive electrode containing 5% by weight conductive CoOOH powder, Ni(OH)$_2$ binder, thickener, and paste stabilizer was prepared using the procedure described in Gaydos and Luo, "Hydrogen Storage Alloy"—U.S. Ser. No. 08/866,192, filed May 30, 1997, now abandoned, which is incorporated by reference in its entirety herein and which is to be commonly owned with the present application. Closed cells including the positive electrode, a negative electrode, and a polypropylene separator were then prepared, also as described in U.S. Ser. No. 08/866,192.

In addition to being used in the nickel/metal hydride battery described in Example 5, electrochemically synthesized CoOOH can be used in the preparation of other types of batteries as well, including lithium cobalt batteries. The CoOOH can be also used in any other applications where conductive CoOOH is useful. Other embodiments are within the claims.

What is claimed is:

1. A method of manufacturing a battery, said method comprising
   (a) providing a positive electrode, a negative electrode, a cobalt oxyhydroxide precursor, and a basic solution to form a combination;
   (b) applying a current to said positive electrode to form conductive cobalt oxyhydroxide on said positive electrode;
   (c) removing said conductive cobalt oxyhydroxide from said combination;
   (d) combining said removed conductive cobalt oxyhydroxide with nickel hydroxide to form a second positive electrode; and
   (e) combining said second positive electrode with a second negative electrode, a separator, and an electrolyte to form a battery.

2. The method of claim 1, wherein said precursor comprises cobalt oxide.

3. The method of claim 1, wherein said precursor comprises cobalt hydroxide.

4. The method of claim 1, wherein said basic solution comprises KOH.

5. The method of claim 1, wherein said positive electrode comprises nickel.

6. The method of claim 1, wherein said positive electrode comprises nickel plate.

7. The method of claim 1, wherein said positive electrode comprises nickel foam.

8. The method of claim 7, wherein said positive electrode further comprises cobalt oxide.

9. The method of claim 1, wherein said negative electrode comprises platinum.

10. The method of claim 1, wherein said negative electrode comprises platinum plate.

11. The method of claim 1, wherein said negative electrode comprises platinum gauze.

12. The method of claim 1, wherein said conductive cobalt oxyhydroxide has a conductivity of at least 0.5 s/cm.

13. The method of claim 1, wherein said conductive cobalt oxyhydroxide has a conductivity of at least 1.0 s/cm.

14. The method of claim 1, wherein said conductive cobalt oxyhydroxide has a conductivity of at least 1.5 s/cm.

15. The method of claim 1, wherein said conductive cobalt oxyhydroxide has a conductivity of at least 2.0 s/cm.

16. The method of claim 1, wherein said conductive cobalt oxyhydroxide has a conductivity of at least 2.5 s/cm.

* * * * *